(No Model.)   3 Sheets—Sheet 1.

D. R. BREED.
COMBINATION LOCK.

No. 443,218.   Patented Dec. 23, 1890.

Witnesses,

Inventor,
David R. Breed
By Price & Fisher
Atty's, (No Model.)  3 Sheets—Sheet 2.

D. R. BREED.
COMBINATION LOCK.

No. 443,218.  Patented Dec. 23, 1890.

Witnesses,
T. T. Mann
R. J. Jacker

Inventor,
David R. Breed
By Peirce & Fisher
Attys.

(No Model.) 3 Sheets—Sheet 3.
D. R. BREED.
COMBINATION LOCK.
No. 443,218. Patented Dec. 23, 1890.
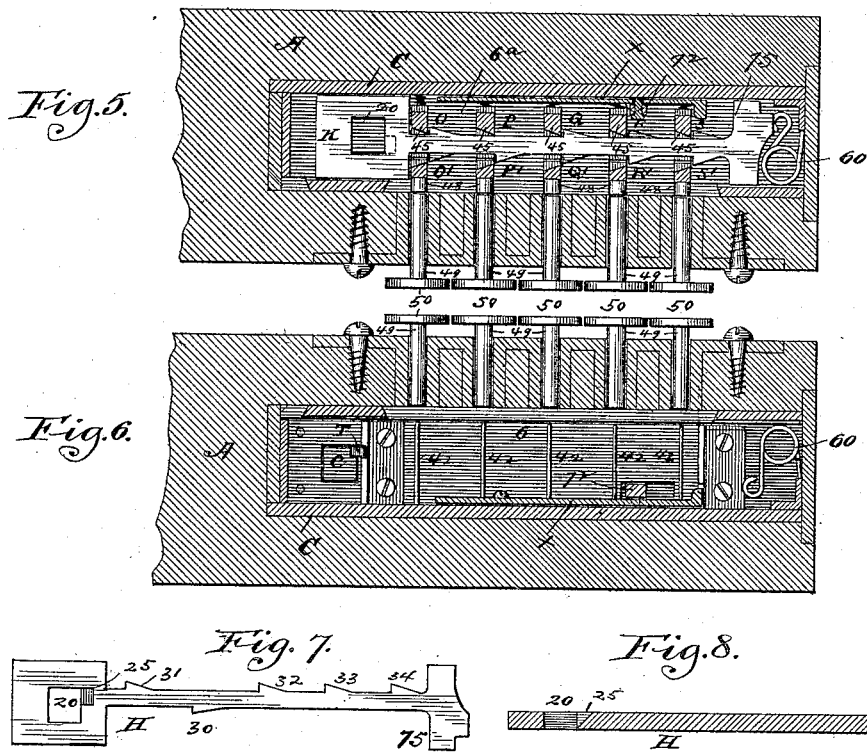
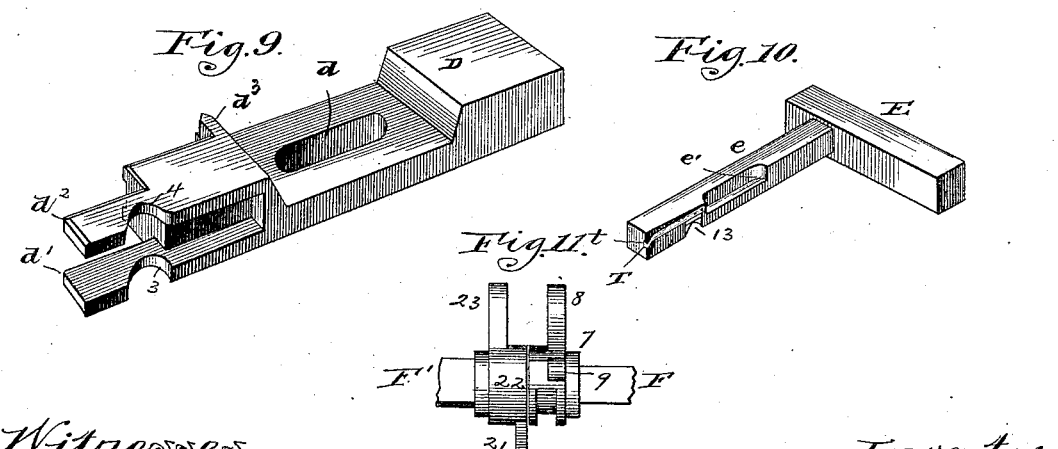
Witnesses,
T. F. Mann
R. J. Jacker
Inventor,
David R. Breed
By, Price & Fisher
Atty's

UNITED STATES PATENT OFFICE.

DAVID R. BREED, OF CHICAGO, ILLINOIS.

COMBINATION-LOCK.

SPECIFICATION forming part of Letters Patent No. 443,218, dated December 23, 1890.

Application filed December 19, 1889. Serial No. 334,334. (No model.)

*To all whom it may concern:*

Be it known that I, DAVID R. BREED, a resident of Chicago, in the county of Cook and State of Illinois, have invented certain new and useful Improvements in Combination-Lock Mechanism, of which I do declare the following to be a full, clear, and exact description, reference being had to the accompanying drawings, forming part of this specification.

My present invention has relation more particularly to lock mechanism of that type wherein the lock-bolt has its movement checked by means of the dog, such dog being controlled by suitable plates or gates, the release of which can only be effected by the operation of keys in proper predetermined order.

The invention consists in the various novel features of construction hereinafter described, illustrated in the accompanying drawings, and particularly pointed out in the claims at the end of this specification.

Figure 1:
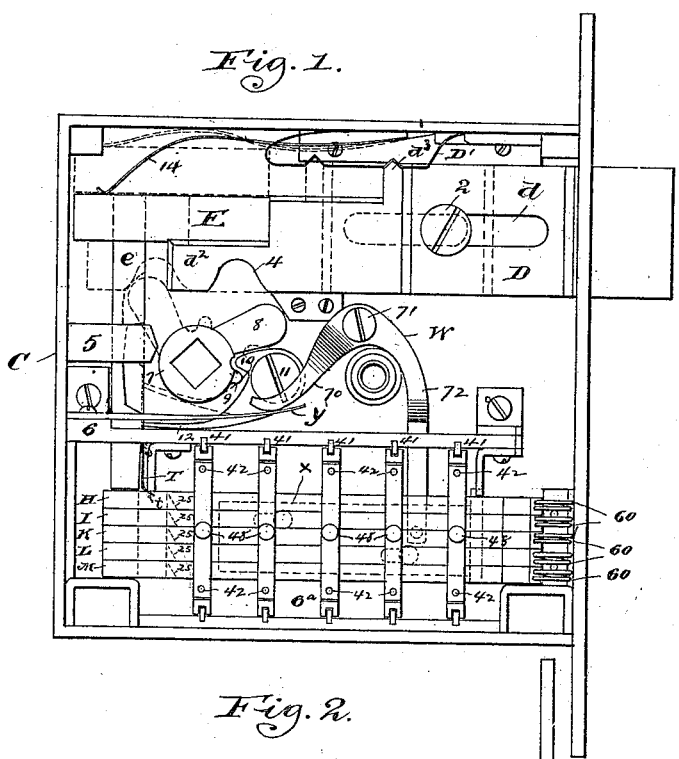
Figure 2:
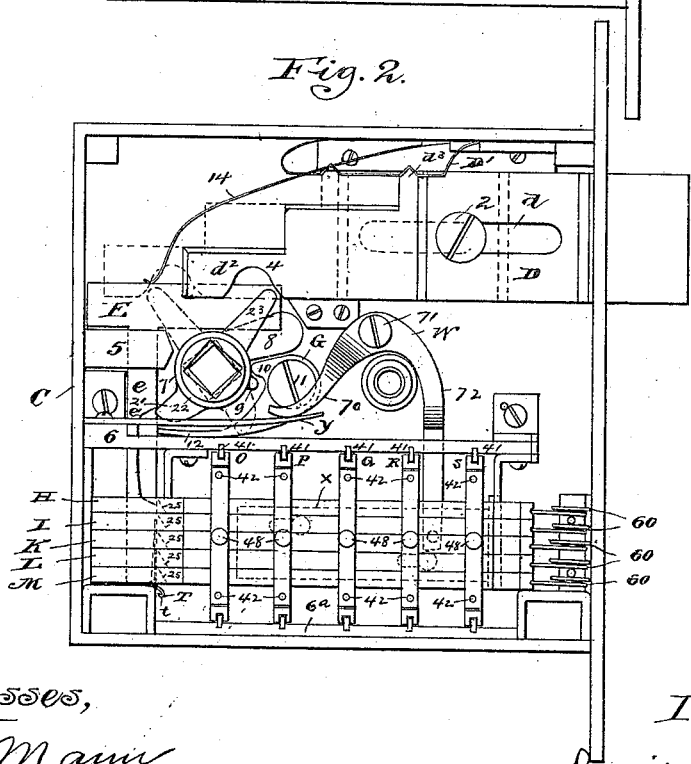
Figure 3:
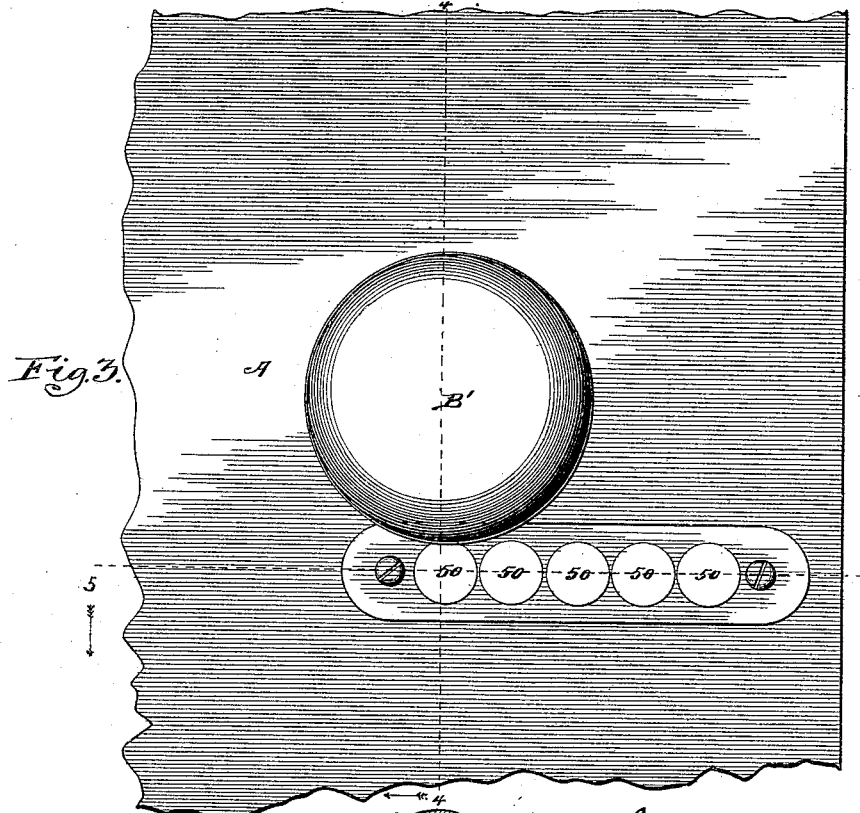
Figure 4:
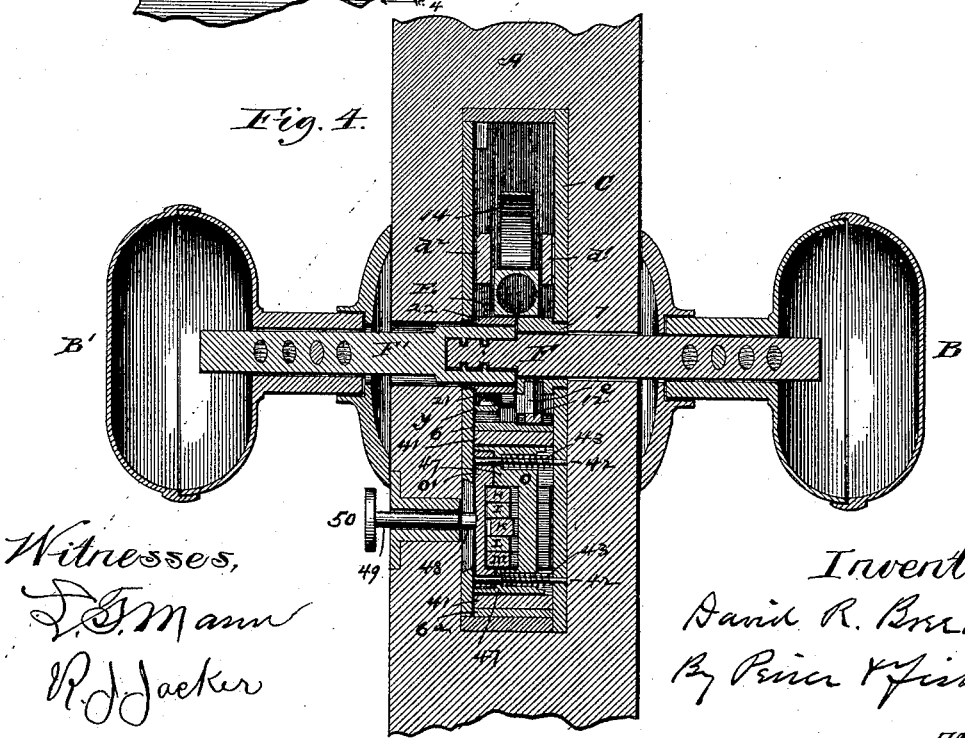

Figure 1 is a view in side elevation of my improved lock mechanism, the face-plate of the casing being removed and the operating-spindles and the collar of the outer spindle being also removed. Fig. 2 is a view similar to Fig. 1, but showing the parts in different position, the dog being retracted to permit the backward movement of the locking-bolt. Fig. 3 is a view in side elevation of a portion of the outer side of a door having my lock mechanism applied thereto, this view showing the door-knob and the keys by which the movement of the lock mechanism is controlled. Fig. 4 is a view in vertical transverse section on line 4 4 of Fig. 3. Fig. 5 is a view in horizontal transverse section on line 5 5 of Fig. 4. Fig. 6 is a view in horizontal section on lines 6 6 of Fig. 4. Fig. 7 is a detail inverted plan view of one of the gates by which the movement of the dog that controls the locking-bolt is checked. Fig. 8 is a view in longitudinal section through the gate shown in Fig. 7. Fig. 9 is a detail perspective view of the locking-bolt. Fig. 10 is a detail perspective view of the dog by which the movement of the locking-bolt is checked. Fig. 11 is a detail view showing the sections of the divided spindle with the collars thereon.

A designates a portion of the door, within which the lock is held, and B and B' denote, respectively, the knobs upon the inner and outer sides of the door.

C is the lock-casing, within the upper part of which is sustained the locking-bolt D, provided with the slot $d$, through which passes the screw 2, the threaded end of which enters the casing, and the expanded head of which serves to retain the bolt in operative position. By preference the upper portion of the bolt D is provided with a beveled shoulder $d^3$, adapted to engage with the correspondingly-beveled seats formed in the spring D', in order to retain the bolt against accidental movement in either of its extreme positions. The rear end or shank of the bolt D (see Fig. 9) is preferably provided with the arms $d'$ and $d^2$, in which are formed, respectively, the seats 3 and 4, that serve to receive suitable extensions or arms projecting from the spindle for the purpose of operating the bolt.

At the back of the bolt D is the dog E, the stem $e$ of which is guided by the slotted block 5 and by the plate 6, through which the stem passes. The dog E when bearing against the rear end of the bolt D will effectively serve to prevent the backward movement of the bolt to unlock the door; but in order to enable the door to be readily opened by merely turning the inner knob B, I provide that portion of the spindle F that is connected to the inner knob with a collar 7, having not merely an arm or extension 8 for entering the seat 3 of the bolt-arm $d'$, but having also a shoulder or projection 9, adapted to contact with the shorter arm 10 of the "throw-off" lever G, that is pivoted, as at 11, and has its longer arm 12 extending into position to engage a suitable notch or shoulder 13 in the stem $e$ of the dog. From this construction it will be seen that if the bolt D is in locked position and the inside knob B be turned to open the door the turning of the spindle of this knob will first cause the shoulder or projection 9 to contact with the short arm 10 of the throw-off lever D, thereby causing this lever to rock about its pivot-point 11, so that its longer arm 12 shall engage with the shoulder 13 of the stem $e$ of the dog, thereby lifting this dog against the force of the spring 14 until it no longer checks the movement of the bolt, and when the dog has been thus lifted the further movement of the spindle causes the arm 8 to enter the seat 3 of the bolt and retract the bolt to unlock the door. It will be observed that the part F of the spindle that connects with the inner knob B is distinct from, although by preference pivotally connected with, the part F' of the spindle that is joined to the outer knob B', so that the movements of the knobs B and B' shall be independent, each knob effecting movement only of its corresponding spindle.

The spring 14 tends to force the dog E normally downward and away from engagement with the bolt D; but this downward movement of the bolt is resisted by a series of plates or gates H I K L M, having cut-away spaces 20 in their ends, through which the stem $e$ of the dog can pass when the gates have been brought in proper order with such spaces beneath the lower end of the dog. By reference to Fig. 7 it will be seen that the several gates have been brought into proper position for releasing the dog and the dog has passed from engagement with the bolt and the bolt is ready to be thrown by the operation of the knob B' and spindle F', this spindle being provided with a collar 22, having an extension 23, that engages with the seat 4 to force backward the bolt. Each of the gates is provided with a series of shoulders or projections, by preference, upon both its opposite edges, the shoulders upon the inner edges of the gates or plates being engaged by suitable stops O P Q R S, while the shoulders upon the outer edges are engaged by corresponding stops O' P' Q' R' S'. These shoulders or stops may be of any desired number and their precise construction and arrangement may also be varied as desired.

By preference each of the inner stops O P Q R S consists of a frame having grooves in its sides to engage with the ribs 41, (see Figs. 1 and 2,) projecting inwardly from the plate 6 and with corresponding ribs projecting inwardly from the plate 6ª, and by preference, also, each of these stops is perforated to receive the pins 42, which project upwardly, and about which are held the coiled springs 43, that serve to press the stops into normal engagement with the shoulders of the plates. The central portion 45 of each of the several stops which contact with the shoulders is beveled, as shown, so that the correspondingly-beveled shoulders of the plates can ride freely over said stops when the plates are to be restored to position for holding the dog in place to check the bolt. Upon the shoulders 47 of each of the lower stops rests the upper stops O' P', &c., and by preference each of these upper stops is provided with a lug or stud 48, against which will bear the stem 49 of a corresponding key 50, that projects from the outer face of the door into contact with these studs.

My purpose in forming the plates with shoulders upon both their opposite edges is to enable a very great number of combinations to be made with comparatively few plates, and my object in forming the stops for these shoulders separate from each other and sustaining them so that they can be spread apart is to enable the plates to be freely restored to a position for holding the dog in engagement with the bolt—that is to say, so that when the plates are forced backward to position to arrest the dog the shoulders on the opposite edges of the plates can at the same time force outward the stops, which would not be possible if the stops were rigidly connected together.

It will be observed that each of the plates O, &c., is provided not only with the cut-away space 20, but the under side of the plate, or the side farthest from the stem $e$ of the dog, is cut away to form a notch or space 25, that terminates adjacent the upper face of the plate. (See inverted views, Figs. 7 and 8.) The purpose of this notch or space 25 is to admit a pawl or catch T, (preferably a bent spring,) that is attached to the lower end of the stem $e$ of the dog, this pawl having by preference a beveled end $t$, as shown. From this construction it will be seen that when the end of the stem $e$ of the dog is resting against the upper face of the plate H (see Fig. 1) the pawl T projects through the cut-away space 20 of the plate, so that if the top plate H be released first in order the stem $e$ will be forced by the spring 14 through the cut-away space 20, and against the face of the plate I next below it. So, also, if the plate I be next released, the stem $e$ and pawl T will pass through this plate and rest upon the plate K, and so on through the series of plates until the dog E has passed from out of engagement with the bolt, (see Fig. 2,) after which the bolt can be withdrawn by merely turning the knob B', causing this spindle 16 by its arm or extension 23 to engage with the arm $d^2$ of the bolt in order to operate the bolt. It will be seen, however, that the dog E does not cease to check the movement of the bolt until the stem $e$ of this dog has passed completely through the cut-away spaces 20 of all of the plates I H, &c. Hence, if the plate I, for example, be released before the plate H has been released, the pawl T will stand above the edge of the plate I, and consequently when the plate H is released the ends $t$ of the pawl T will strike against the upper face of the plate I and will prevent the passage of the stem $e$ of the dog through such plate. This preventing of the passage of the stem through the plates by reason of the pawl T will occur also if any of the several plates of the series are released out of the predetermined order—that is to say, the top plate H must be first released and the succeeding plates must be released thereafter in their regular order, so as to enable the stem $e$ of the dog and the pawl T to pass through the several plates. It will be observed that when all of the plates are in retracted position to hold the dog in engagement with the bolt the stem $e$ of the dog rests upon the upper face of the plate H, while the beveled end $t$ of the pawl T projects through the cut-away space 20 of this plate. If now the plate I be released before the release of the plate H, the pawl T will stand above the upper face of the plate I, and, as already stated, will remain there, because when the plate H is released it will not force backward this pawl, for the reason that the beveled end $t$ of the pawl will pass into the notch 25 of the plate H, and consequently will not be pushed out of engagement with the plate I. It will thus be seen that provision is not only made by which it is necessary in order to release the lock-bolt that the proper combinations shall be operated so as to release the plates, but that these combinations shall be operated and the plates released in regular succession. By this means the complexity of the combinations is so far increased that all danger of the operation of the lock by merely working various combinations of the keys is avoided.

It will be observed that the shoulders upon one edge of each of the plates H, &c., are formed opposite blank spaces upon the other edge of such plate, since if the shoulders occurred directly opposite each other the depressions of the stops O', &c., to release the lower stops would bring the upper stops into engagement with adjacent shoulders, and consequently prevent the release of the plates. In the construction shown the plate H is shown as having upon its inner edge the shoulder 30, adapted to be engaged by the corresponding inner stop P, and upon its opposite or outer edge this plate is provided with the shoulder 31, adapted to be engaged by the outer stop O', and with the shoulders 32, 33, and 34, adapted to be engaged, respectively, by the outer stops Q', R', and S'. As the outer stops O', &c., are normally held out of engagement with the shoulders of the plates by the coiled springs 43, (see Fig. 4,) it is plain that by the depression of the stop P, which engages the inner shoulder 30 of the plate, and holds the plate in retracted position, the release of the plate can be effected, although if either of the other stops be at the same time depressed by the operation of the keys 50 such other stop will engage with a corresponding shoulder upon the outer edge of the plate and prevent the release of the plate. Hence in order to effect the release of the dog E it is necessary to first depress the key 50, that is located in front of and serves to operate the stops P and P', thereby depressing the stop P and causing the release of the plate or gate H. As soon as this plate H is released the spring 14 will force downward the dog E, causing the lower end of its stem $e$ to pass through the cut-away space 20 and to rest upon the upper face of the plate I, while the end $t$ of the pawl or catch T will project into the cut-away space 20 of this plate I. As the plate I is provided upon its inner edge with two shoulders that are engaged by the stops R and S, it will be necessary to depress both of these stops before the release of this second plate can be effected. By depressing the keys 50, that bear upon the stops R' and S', a corresponding depression of the stops R and S will be secured to effect the release of the plate I, and as this plate I is released the stem $e$ of the dog E passes through its cut-away space 20 and permits the end $t$ of the stem T to enter the cut-away space of the next plate K. As the plate K is held against movement by the stops O and Q, that engage with corresponding shoulders upon the inner edge of such plate, it is plain that by depressing the keys 50, corresponding to these stops O and Q, the release of this plate K will occur and the end of the stem $e$ will be forced through this plate, permitting the end of the pawl T to enter the cut-away space of the next subjacent plate L. As the plate L is held retracted by a shoulder upon its inner edge engaging with the stop R, the release of this plate can be effected by depressing the key 50, that operates this stop, and when this plate L is released and forced forward the end of the stem $e$ of the dog will be forced through this plate, carrying the end of the pawl T into the cut-away space 20 of the plate L. As the plate L is held by the engagement of its shoulders with the stops Q and S, it is obvious that by depressing the keys 50, corresponding with these stops, the release of this plate will occur, thereby permitting the end of the stem $e$ of the dog to be projected through the plate M, so that the dog E will occupy a position beneath the rear end of the bolt D, thereby permitting this bolt to be freely operated by the spindle F' of the outer knob. It will be observed that a series of springs 60 is employed for forcing the plates from their retracted position, one end of such springs being suitably affixed to the lock-casing, while the opposite end bears against the end of the corresponding plate.

In order to enable the dog to be lifted into a position to check the movement of the locking-bolt and at the same time to force backward the plates or gates H I, &c., into retracted position for holding the dog in engagement with the bolt D, I have provided the spindle F' of the outer knob not merely with the bar or extension 23, but also with an arm or extension 21, which, after the spindle F' has been turned to sufficient extent to cause the arm 23 to force the bolt D to the locked position, will engage with a shoulder $e'$ upon the stem $e$ of the dog, so that as the further movement of this spindle occurs the arm 21 will lift the dog E into position to check the backward movement of the bolt. At the same time the arm 23 will contact with the bent end 70 of the restoring-lever W, that is pivotally sustained, as at 71, the longer arm 72 of this restoring-lever being extended beneath the plates H I, &c., and being connected with a plate X, that bears against the depending shoulders 75 of the gates H I, &c., so that when this plate X is forced backward by the lever W it will carry with it all the plates H I, &c., causing their respective shoulders to be engaged by the stops O, P, Q, R, and S. A spring Y, affixed to the plate 6, has its free end extended beneath the end of the restoring-lever W, serving to normally lift the end 70 of the lever W, and consequently hold the plate X in such position that it will not interfere with the releasing of the several plates H I, &c.

It will be readily understood that the precise details of construction above described may be varied by the skilled mechanic without departing from the spirit of the invention, and that parts of the invention may be employed without its adoption as an entirety.

Having thus described my invention, what I claim as new, and desire to secure by Letters Patent, is—

1. In lock mechanism, the combination, with a bolt and a dog for checking its movement, of a pivoted throw-off lever for throwing said dog out of action, and a spindle provided with means for operating the bolt and with an extension or lug to engage one end of the pivoted lever, thereby causing said lever to throw the dog out of action in order to permit the bolt to be withdrawn, substantially as described.

2. In lock mechanism, the combination, with a bolt and a dog for checking its movement, of a divided spindle, one section only of which is provided with means for throwing the dog out of engagement with the bolt and for operating the bolt, and the other section of which is provided with means for operating the bolt when the dog has been otherwise thrown out of action, substantially as described.

3. In lock mechanism, the combination, with a bolt and a dog for checking its movement, of a spring for throwing the dog into normal engagement with said bolt, a divided spindle, one section only of which is provided with an arm to engage the bolt and a shoulder to engage a throw-off lever, a pivoted throw-off lever for throwing said dog out of action, and another section of said spindle provided with means for operating the bolt when it has been otherwise released, substantially as described.

4. In lock mechanism, the combination, with a bolt and a dog for checking its movement, of a series of gates for preventing the passage of said dog out of operative position in one direction and a spindle provided with means for moving the dog out of operative position in the opposite direction, so that the position of the gates will not be disturbed, substantially as described.

5. In lock mechanism, the combination, with a bolt and a dog for checking its movement, of a series of gates for arresting the dog, said gates having cut-away spaces to admit the stem of the dog and being provided with a series of shoulders, and a series of movable stops for engagement with said shoulders, substantially as described.

6. In lock mechanism, the combination, with a bolt and a dog for checking its movement, of a series of gates for arresting the dog, having shoulders upon their opposite edges, and a double series of movable stops for engagement with said opposite shoulders, substantially as described.

7. In lock mechanism, the combination, with a bolt and a dog for checking its movement, of a series of gates for arresting said dog, having oppositely-arranged shoulders, and a double series of independently-movable stops for engagement with said shoulders, substantially as described.

8. In lock mechanism, the combination, with a bolt and a dog for checking its movement, of a series of gates having their ends perforated to admit the shank of said dog, and having shoulders whereby the movement of said gates can be checked, spring mechanism for forcing backward said gates, a series of individual stops for engagement with said shoulders, and a series of individual keys for operating said stops to release the gates and permit the dog to be thrown out of engagement with the bolt, substantially as described.

9. In lock mechanism, the combination, with a bolt and a dog for checking its movement, of a series of gates having cut-away spaces to admit the stem of the dog, suitable means for checking the movement of said gates, a pawl on the stem of the dog to prevent the withdrawal of the dog from the bolt when the gates are released out of order, and suitable means for releasing said gates, substantially as described.

10. In lock mechanism, the combination, with a bolt and a dog for checking its movement, of a series of gates having cut-away spaces to admit the stem of the dog and to admit a pawl attached to said dog, and suitable means for checking the movement of said gates, a spring pawl or stop on said stem to prevent the passage of the dog-stem into the cut-away spaces or gates, except when the gates are released in proper order, and suitable means for releasing said gates, substantially as described.

11. In lock mechanism, the combination, with a bolt, of a dog for checking its movement, having a stem and a movable pawl with outwardly-projecting portion, a series of gates having cut-away spaces to admit the dog-stem, and having cut-away spaces on their under sides to permit outward movement of the end of the pawl, and suitable means for releasing said gate, substantially as described.

12. In lock mechanism, the combination, with a bolt and a dog for checking its movement, of a series of spring-actuated gates having cut-away spaces at their ends to admit the dog-stem and having beveled shoulders upon their opposite edges, and a series of spring-seated stops for engaging the inner set of shoulders, a series of independent movable stops for engaging the outer set of shoulders, and suitable keys for depressing said stops to release the gates, substantially as described.

13. In lock mechanism, the combination, with a bolt and a dog for checking its movement, of a series of gates for temporarily holding the dog in position to check the bolt, a spindle provided with an extension for operating the bolt when the dog has been released, and a retracting-lever for restoring the gates to their operative position, said lever projecting into the path of the extension from said spindle, substantially as described.

14. In lock mechanism, the combination, with a bolt and a dog for checking its movement, of a series of gates for temporarily holding the dog in position to check the bolt, a spindle provided with an extension for operating the bolt, and with an arm or extension for engagement with the dog to restore the same to position for checking the bolt, a series of gates for arresting the movement of said dog, and a retracting-lever for restoring said gates to position after they have been released, substantially as described.

15. In lock mechanism, the combination, with the door, of a series of keys sustained thereby and terminating at one side of the lock-casing, a lock-casing movable independently of said keys, and lock mechanism within said casing provided with stops adapted to be brought opposite said keys to be operated thereby, whereby the lock-casing can be removed from the door without removing the keys, substantially as described.

DAVID R. BREED.

Witnesses:
GEO. P. FISHER, Jr.,
JAMES H. PEIRCE.